United States Patent [19]
Koch et al.

[11] Patent Number: 6,159,895
[45] Date of Patent: Dec. 12, 2000

[54] ARAMID POLYMER CATALYST SUPPORTS

[75] Inventors: Theodore A. Koch, Wilmington, Del.; Vlodek Gabara, Richmond, Va.; Edward W. Tokarsky, Newark; John J. McEvoy, Wilmington, both of Del.

[73] Assignee: E. I. du Pont de Nemours and Company, Wilmington, Del.

[21] Appl. No.: 09/342,817

[22] Filed: Jun. 29, 1999

Related U.S. Application Data

[60] Provisional application No. 60/091,974, Jul. 7, 1998.

[51] Int. Cl.$^7$ ..................................................... B01J 23/32
[52] U.S. Cl. ......................... 502/324; 502/325; 502/337; 502/338; 502/339; 502/343; 502/345
[58] Field of Search .................................... 502/439, 324, 502/325, 337, 338, 339, 343, 345

[56] References Cited

U.S. PATENT DOCUMENTS

| | | | |
|---|---|---|---|
| 2,747,233 | 5/1956 | Hitt | 19/66 |
| 3,803,453 | 4/1974 | Hull | 317/2 R |
| 4,698,267 | 10/1987 | Tokarsky | 428/474.4 |
| 4,729,921 | 3/1988 | Tokarsky | 428/288 |
| 5,223,550 | 6/1993 | Hughes et al. | 521/134 |
| 5,302,415 | 4/1994 | Gabara et al. | 427/306 |
| 5,389,350 | 2/1995 | Freeman et al. | |
| 5,475,185 | 12/1995 | Tokarsky | 174/36 |
| 5,482,773 | 1/1996 | Bair | 428/368 |
| 5,486,292 | 1/1996 | Bair et al. | 210/616 |
| 5,702,610 | 12/1997 | Hagen et al. | 210/670 |
| 5,733,451 | 3/1998 | Coellner et al. | 210/496 |
| 5,968,598 | 10/1999 | Memeger, Jr. | |

FOREIGN PATENT DOCUMENTS

| | | | |
|---|---|---|---|
| 1 514 373 | 6/1978 | Italy | C07C 5/48 |
| 61-021206 | 5/1986 | Japan | A62D 3/00 |
| 61-21206 | 5/1986 | Japan | C07C 1/26 |
| H10-195763 | 7/1988 | Japan | D06M 11/00 |
| 7-47287 | 2/1995 | Japan | B01J 35/06 |
| 10 046484 | 2/1998 | Japan | D21H 13/24 |

OTHER PUBLICATIONS

Cum Giapietro et al., Polymer–Supported Catalysts—Selective Hydrogenation of Acid Chlorides Over Palladium/Polyamide, *Journal Chem Technol Biotechnol Chem Technol*, 34A, No. 8, 416–422, Nov. 1984.

*Primary Examiner*—Tom Dunn

[57] ABSTRACT

A catalyst composition is disclosed which includes a p-aramid polymer supporting a catalyst agent. The composition exhibits improved catalytic activity when compared with a similar composition using m-aramid polymer as the support. The composition contemplates shaped and formed catalyst structures using p-aramid particles and fibers, as papers and fabrics, and as, for example, honeycomb and mats.

7 Claims, No Drawings

ARAMID POLYMER CATALYST SUPPORTS

This Application is based on provisional application No. 60/091,974, filed Jul. 7, 1998.

The present invention relates to a catalyst composition in which p-aramid polymer is used as the support for catalytic active sites or functions as a component of the catalyst system. Catalyst compositions according to the present invention may be used in a variety of chemical reactions and may be formed into a variety of shapes.

BACKGROUND OF THE INVENTION

Catalysts, which exist as a separate phase from the reactants and/or reaction product mixtures have generally been supported on inorganic particles or carbon fibers. These support materials lack flexibility and durability. Often times the nature of the support material dictates the geometry of the reactor and the service life of the catalyst.

Catalysts having inorganic supports are often heavy and awkward to deal with. They are generally in the form of small particles and have associated dust and fines. Such catalysts are often brittle or may become brittle in use; they may fracture or crumble causing increases in pressure drop or decreases in through-put of the chemical reaction that they are designed to facilitate. The support particles, and therefore, the catalyst, may shrink in service.

Catalysts on particulate supports generally require long times for charging into and discharging out of the reactors. The weight and the brittleness of the support also contributes to relatively long reductions or activation times once the catalyst is installed in the reactor. Because of the nature of the inorganic particulate catalyst support, once a reactor is charged, it may have to operate for some period of time, even at marginal rates, before a change out of catalyst is economical.

Resins have been used in some catalyst applications. For example, Japanese Patent Publication (Kokai) 55(1980)-149355 teaches the use of a heat resistant resin in a self-cleaning liner for microwave ovens. The resin's function is as a binder layer between oxidation catalyst particles and the support structure. The resin is not used as the catalyst support.

Japanese Patent Publication (Kokai) 56-118743 teaches a catalyst material for use in the water-hydrogen isotropic substitution reaction where the catalyst is packed into a porous bag. The bag is constructed from a fabric or a net. The fabric or net simply houses the catalyst and is not a catalyst support.

Japanese Patent Publication (Kokoku) 61-21206 teaches a catalyst of palladium supported on m-aramid polymer particles for use in dehydrohalogenation reactions. The polymer particles are required to be a m-aramid wherein the main constituent unit is m-phenylene isophthalamide.

Japanese Patent publication (Kokai) 7-47287 (1995) teaches a catalytic paper containing 5 to 30% fiber pulp, 5 to 15% glass fibers, 5 to 30% sepiolite and 30 to 85% catalyst material. This paper catalyst system requires the presence of sepiolite and large concentrations of catalyst material for activity.

U.S. Pat. No. 5,223,550 teaches a method for making a polybenzimidazole-containing fine particles. These particles are suggested as a possible catalyst support.

SUMMARY OF THE INVENTION

The present invention is a catalyst composition consisting essentially of a catalyst support with a catalyst agent adhered thereto, wherein the catalyst support is p-aramid polymer and the catalyst agent is adhered on or within the support.

The catalyst agent comprises metals, metal ions, metal oxides, metal complexes, zeolites, silicates, ions or compounds supported on carbon particles, ions or compounds supported on oxide particles or ions or compounds supported on silicate particles.

The metallic elements useful in forming the catalyst agent comprise the metals of Groups Ib, IIb, VIa, VIIa and particularly Group VIII of the Periodic Chart. Preferred metals are platinum, palladium, nickel, cobalt, manganese, ruthenium, rhodium, iridium, copper, iron, zinc and combinations of these metals. Preferred oxide catalysts are oxides of aluminum, copper, cobalt, manganese, vanadium, chromium, iron, silver, zinc, platinum, palladium and mixtures of these oxides.

Preferred compounds are metal complex and organometallic compounds selected from the group consisting of cations and anions containing boron, aluminum, arsenic, cadmium, cobalt, chromium, iron, gallium, germanium, iron, nickel, osmium, phosphorus, antimony, bismuth, iridium, platinum, ruthenium, rhodium, tin, zinc, and combinations of these.

Nonmetal compounds also form catalyst agents. Preferred nonmetals include proton donors including acid such as perfluorosulfonic acid mixed with fluoropolymers and strong acids, acid salts; metal oxides including the oxides of copper, manganese, aluminum and silicon; and zeolites.

The catalyst agent is present in a concentration of 0.05% to not more than 20% by weight of the total of the catalyst agent and the p-aramid support. Preferred concentration of the catalyst agent is 0.5% to not more than 5%.

The present invention also encompasses a shaped aramid polymer structure having catalytic activity comprising a structure selected from the group consisting of p-aramid papers and p-aramid containing materials selected from the group consisting of particles, fibers, fabrics, batts, felts, mats, honeycomb structures, tube structures, cartridge structures, porous membranes, films, ribbons and catalyst agents supported on or incorporated into the structure.

DETAILED DESCRIPTION

The present invention is a catalyst composition consisting essentially of catalyst agent supported on or within a p-aramid. Another way to think of the present invention is that it is a shaped structure made from p-aramid polymer and incorporating a catalyst agent. This catalyst composition may be selected from the group consisting of papers, particles, fibers, fabrics, including spunlaced fabrics, batts, felts, mats, films, membranes, ribbons and the like. Papers or fabrics may be formed into shaped structures such as honeycombs, tubes, wheels, cartridge structures, porous membranes, layered structures and the like.

By "aramid" is meant a polyamide wherein at least 85% of the amide (—CO—NH—) linkages are attached directly to two aromatic rings. Suitable aramid fibers include those described in Man-Made Fibers-Science and Technology, Volume 2, Section titled Fiber-Forming Aromatic Polyamides, page 297, W. Black et al., Interscience Publishers, 1968. Aramid fibers are also disclosed in U.S. Pat. Nos. 4,172,938; 3,869,429; 3,819,587; 3,673,143; 3,354,127; and 3,094,511.

P-aramid polymers suitable for the present invention may be prepared by using terephthaloyl chlorides and para-aromatic diamines to make a variety of polymers. Such polymers may be designed to have particular thermal properties or polymer surface chemistries to enhance the usefulness, selectivity or yield of the catalyst composition of the present invention.

Sulfonated p-aramid polymers are also acceptable for use in the present invention such as those described in U.S. Pat. Nos. 5,336,734; 4,075,269; 4,163,346 and 5,660,779; and European Patent Application 427280A. Such polymers may be used alone or mixed in combinations with non-sulfonated p-aramid polymers.

Additives can be used with the p-aramid polymers, and it has been found that up to as much as 10 percent, by weight, of other polymeric material can be blended with the p-aramid polymer.

P-aramid polymers may also be mixed with other heat stable polymers to form suitable polymers for the present invention. For example, polybenzimidazole(PBI) may be mixed with the p-aramid polymers to form catalyst supports of the present invention.

P-aramids are the polymers in the catalyst supports of this invention and poly(p-phenylene terephthalamide) (PPD-T) is the most preferred p-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides, such as, for example, 2,6-naphthaloyl chloride or chloro- or dichloro-terephthaloyl chloride, can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction.

The catalyst agent is a substance which causes a chemical reaction to take place, but is itself not transformed into a product of the reaction.

A precursor catalyst agent is a material that, on activation, for example, reduction, produces the catalyst agent.

The term "catalyst composition", as used in this specification, includes the combination of the catalyst agent and the polymer support. In some reactions, the rate of the reaction, the product selectivity or both may be influenced by the combination of a known catalyst agent with the p-aramid polymer support structure. The shape into which the catalyst composition is formed may also influence the reaction rate, the product/byproduct ratios and the service life, since shape will impact, to some extent, reactant flow and contact time.

The catalyst composition according to the present invention, includes p-aramid polymer as a catalyst support. As the p-aramid polymer catalyst support of the present invention, the polymer may be used, for example, in the form of granules, particles, fibers including pulps, or pellets in which the catalyst agent may be deposited on the polymer or incorporated into the polymer either before or after the polymer is shaped into a specific structure. For example, (1) the polymer may first be spun into a fiber, and then the fibers may be treated with the catalyst agent, or with a precursor of the catalyst agent; (2) the catalyst agent or a precursor of the catalyst agent may be mixed directly with a spin polymer solution and spun into fibers; or (3) the catalyst agent or a precursor of the catalyst agent may first be deposited or incorporated into particles such as carbon, inorganic oxide or zeolite particles, and the resulting catalyst agent may be deposited on the surface of fibers, ribbons, strips, films, granules or the like or incorporated into polymer solutions from which polymer shapes may be formed. These three methods of incorporating a catalyst agent in a polymer catalyst support are representative but not intended to limit how the polymer and catalyst agent may be combined into the catalyst composition of this invention.

The technique of depositing or incorporating the catalyst agent or precursor of the catalyst agent onto or into the supporting polymer depends on the catalyst composition one desires to form and the catalytic activity one desires to maintain. Not all catalytically active materials can tolerate the conditions required to spin p-aramid polymer or to cast p-aramid polymer films. In these cases, it is preferred that the catalyst composition be made by depositing on the surface of the p-aramid polymer the desired catalyst agent or the precursor of the catalyst agent.

For example, to prepare a catalyst composition fiber or fabric, a fiber or yarn may first be formed from the p-aramid polymer. The fiber or yarn may then be coated or treated with the catalyst agent or precursor catalyst agent. Alternatively, the treated fiber may, first, be formed into yarns and then formed into catalytically active articles, for example, woven or knitted fabrics, mats, felts, or batts. The treated fiber and yarns may be twisted together or pulled through a backing to make a brush or pile or loop material such as a carpet.

The treated yarn may be formed into wound articles, including wound or braided shapes. It can be added into a weave or knit so that the treated yarn is located in particular positions in the resulting fabric or located primarily on a particular face of a fabric. The yarn may be woven into a variety of fabrics such that the fabric porosity and surface area may be selected to enhance the desired catalyzed reaction. The yarn may also be woven in combinations with other yarns so that the resulting catalyst fabric has the desired mechanical properties for its intended use.

Fabrics may first be woven or fibers formed into mats, batts or felts. Then these articles may be treated with the catalyst agent or precursor catalyst agent. In the case where metals or metal containing compounds are the catalyst agent or the precursor catalyst agent, the fiber, yarn or fabric may be plated with the metal. Metal deposition on the fibers or yarns may be accomplished by processes such as electroless plating as taught in U.S. Pat. No. 5,302,415.

Metals may also be deposited on the fibers and yarns, fabrics and papers by electrostatic deposition, dielectric deposition, vapor deposition and the like. Combinations or mixtures of metals may be deposited together using these techniques to produce well dispersed mixtures on the polymer surface. Metals deposited directly on the polymer by such techniques show very good metal adhesion to the polymer surface.

In particular, metals deposited on the polymer by electroless plating show excellent metal to polymer adhesion. The adhesion achieved by electroless deposition allows the fibers to be processed into yarns, fabrics and papers after the metal deposition so that in the finished article, the fibers are uniformly coated with the catalyst agent or the precursor catalyst agent. Fabrics and papers may be made first and then plated with metal or metals my be deposited on the fibers to be used in fabric or paper manufacture.

Electroless plated fabrics and papers may be formed into shapes easily without loss of catalytic activity. Thus, the surface area and the overall geometry of a catalyst article may be optimized for the reactions for which it is to be used.

Once shaped as desired, the metal may be converted into the desired compound, activated, or used as is. The actual form of the metal will depend upon the desired reaction for which the catalyst is to be used.

P-aramid polymer may be used in the form of staple fibers, fabrics, and papers. For example, to prepare a catalyst paper of the present invention, one could first make the paper by blending p-aramid fibers into the furnish for a paper machine. The concentration of the fibers and fibrids would be selected to provide the desired mechanical properties for the paper. Methods for making aramid papers are found in U.S. Pat. Nos. 5,126,012 and 5,223,094.

Once the p-aramid paper is formed it may be impregnated with a solution containing a catalytic precursor such as a solution of a palladium salt. The paper can then be dried and the palladium ions on the paper reduced by either hydrogen or hydrazine solution to form the catalyst agent.

Alternatively the paper may be made from metal plated fibers, or the paper may be metal plated using methods such as dielectric deposition, electroless plating, vapor deposition and the like.

When fibrids are used, the fibrid may incorporate or encapsulate particles that are catalytically active. Such particles include activated carbon, activated carbon supported catalysts, metal particles, insoluble metal salt or oxide particles, catalyst supported on oxides, silica and silica supported catalysts or zeolites and zeolite supported catalysts. These combinations of fibrids and catalyst particles are made by adding the catalyst particle to a p-aramid spin dope and spinning the polymer solution into a polymer non-solvent while under shear, as described in U.S. Pat. No. 5,482,773.

Catalyst papers and articles formed from papers and fabrics may be placed into service after performing any required activation of the precursor catalyst agent.

The combination of catalytically active sites and the p-aramid polymer structure of the present invention provides a catalyst composition that may take on a variety of shapes. The catalyst shape may be selected or designed to facilitate a reaction, to enhance the mechanical handling features of the catalyst, or to realize ease in the operation of a catalytic process. For example, the catalyst composition may be a honeycomb structure or a tube structure having intricate baffles within the tube walls to increase surface area or alter flow. The catalyst composition paper may be laser drilled to provide the desired reactant and/or product flow.

The polymer structures and shapes are light in weight, easy to handle and are flexible. They can tolerate misuse and handling without breaking. They have little if any dust or fines. Shapes may be designed to be easily and quickly loaded into reactors. Shapes can be made to optimize flow patterns and rates and to enhance heat removal. Catalyst composition systems can be designed for fast and easy removal and for ease in recovery of metals used.

The basic properties of the polymer, high strength and heat stability, permit the use of low denier fibers and yarns in the design of catalyst composition articles of the present invention. Catalyst composition articles of the present invention are light weight and durable. They may be designed as one piece or multiple piece units that can be easily moved into and out of a reactor unit. For example, a honeycomb structure of aramid paper combined with platinum catalyst agent could be used as an automotive exhaust catalyst. This combination is durable and flexible. It allows for the easy recovery of the precious metal from spent catalyst or scrapped cars.

Acid catalyst may also be made according to the present invention by coating or impregnating the aramid polymer structure or shaped article with NAFION, perfluorosulfonic acid/TFE copolymer solution (NAFION is a trademark of the E.I. du Pont de Nemours and Company, Inc. of Wilmington, Del.). Other coatings of acid catalysts agents or precursors are also possible using strong acids or acid salts incorporated in or stuck to the aramid polymer surface. Acid catalysts are useful in the alkylation of alcohols such as the reaction of methanol with isobutylene to yield methyl butyl ether as well as alkylation reactions in general. Acid catalysts of the present invention are useful for example, in ether formation, esterification, and ester hydrolysis.

The catalyst compositions of the present invention may be used as oxidation catalysts, but it is preferred that the reaction temperature be controlled so that the p-aramid support is not oxidized. It may be possible that even with charring the p-aramid polymer support, the catalyst of the present invention remains active. In any event, it is recommended that conditions which destroy the catalyst or the polymer should be avoided.

Hydrogenation reactions may be carried out with the catalyst composition of the present invention. For example, catalysts of the present invention may be used in the hydrogenation of fatty alcohols over a nickel or cobalt catalyst, or for the conversion of nitrites to amines.

Although the temperature stability of the polymer support of the present invention is limited, these catalyst compositions are stable in use up to about 300 to 350° C. This may limit use of such catalysts in some hot oxidation reactions, but in low temperature oxidations or oxidations having low exotherms, the catalysts of the present invention are useful. For example, the combination of a cobalt active site or other oxidative site on an aramid fabric or paper may be used to oxidize low levels of organic emissions to lower or eliminate volatile organic compounds from industrial exhaust gases.

The catalyst compositions of the present invention may be used in reactions run as batch or continuous operations.

Many other uses of the present invention will be evident to those skilled in this art. Some applications are illustrated in the examples below. Although these examples illustrate the present invention, they are not intended to limit the invention.

EXAMPLES

Example 1

This example illustrates the use of a catalyst composition of the present invention in a dehalogenation reaction. The catalyst composition of this invention—palladium on a p-aramid support—was compared with a catalyst control—palladium on a m-aramid support—at a variety of reaction temperatures. The results are reported in Table 1.

The p-aramid catalyst composition of this invention and the m-aramid comparison were made as follows: (a) 0.311 g of palladium chloride was added to 300 milliliters of water with 10 milliliters of concentrated hydrochloric acid and was stirred to obtain a clear solution; (b) 10.09 g of finely-divided p-aramid polymer were stirred with 150 milliliters of the palladium chloride solution for about four hours at about 21 degrees C; (c) 10.04 g of finely-divided m-aramid polymer were stirred with the remaining 150 milliliters of palladium chloride solution for about four hours at about 21 degrees C; (d) each of the mixtures of (b) and (c) was filtered to separate the polymer and, in each case, the polymer was washed twice with 200 milliliters of water before being dried for about 17 hours at about 90 degrees C.

2.5 g of the particles of each polymer, treated with the palladium chloride catalyst agent precursor, were placed in vertical quartz tubes of 25 millimeters diameter with porous support plates. The palladium salt was reduced to palladium metal by flowing hydrogen through the tubes at a rate of 100 cubic centimeters per minute for 2 hours at 180 degrees C.

To evaluate catalyst activity, hydrogen streams of 100 cubic centimeters per minute were saturated with chlorobenzene at room temperature and were then passed through the tubes of catalyst held at various temperatures. The gas exiting the tubes was analyzed for benzene. Exit gases with a higher proportion of benzene are taken to indicate a greater catalytic activity; and the p-aramid supported catalyst of this invention yielded dramatically higher proportions of benzene than did the m-aramid supported comparison.

TABLE 1

| Catalyst Type | Catalyst temp. (C.) | Benzene exiting (%) |
|---|---|---|
| p-aramid | 100 | 39.69 |
|  |  | 44.07 |
|  |  | 45.81 |
| p-aramid | 125 | 80.74 |
|  |  | 81.90 |
|  |  | 81.96 |
| m-aramid | 125 | 12.23 |
|  |  | 13.81 |
|  |  | 13.97 |
| p-aramid | 150 | 95.45 |
|  |  | 93.09 |
|  |  | 93.58 |
| m-aramid | 150 | 22.99 |
|  |  | 22.04 |
|  |  | 25.03 |
| p-aramid | 180 | 94.68 |
|  |  | 97.12 |
|  |  | 96.47 |
| m-aramid | 180 | 41.24 |
|  |  | 41.97 |
|  |  | 42.68 |

In the conduct of this example, the p-aramid material was KEVLAR® brand sold by E. I. du Pont de Nemours and Company of the USA; and the m-aramid material was CONEX® brand sold by Teijin Limited of Japan.

Example 2

This example illustrates the temperature stability of a catalyst composition of the present invention as compared with a catalyst using a m-aramid support. The catalyst compositions were the same as those used in Example 1 and the catalyzed reaction were, also, the same as in Example 1. In this example, the catalyst temperature was maintained at 250° C. and the degree of chlorobenzene to benzene conversion was monitored over time. Table 2 provides test results of catalytic activity as a function of the time that the reaction was on stream.

TABLE 2

| Catalyst Type | Time on Stream (minutes) | Benzene exiting (%) |
|---|---|---|
| p-aramid | 0 | 100 |
|  | 65 | 100 |
|  | 180 | 100 |
|  | 260 | 100 |
|  | 620 | 100 |
|  | 1000 | 100 |

TABLE 2-continued

| Catalyst Type | Time on Stream (minutes) | Benzene exiting (%) |
|---|---|---|
|  | 1050 | 100 |
| m-aramid | 0 | 21.0 |
|  | 6 | 21.8 |
|  | 26 | 20.9 |
|  | 66 | 18.5 |
|  | 221 | 11.0 |
|  | 271 | 9.8 |
|  | 376 | 9.6 |
|  | 951 | 9.8 |

Example 3

This example illustrates the use of a catalyst composition of the present invention in hydrogenation reactions. In this series, the catalyst composition preparations are marked as paragraphs A to E. In each case a screening reaction, hydrogenation of acetone to isopropanol (in a hexane solvent), was run in a 50 cc Parr autoclave reactor at a pressure of 125 to 150 psi of hydrogen gas. The reaction temperature is provided in each reaction description. The amount of reaction product, isopropanol, formed was monitored by gas chromatography and reported in each study below, as volume percent of the solution sampled.

A. A p-aramid polymer powder was treated with a solution of palladium acetate (catalyst agent precursor) as follows: 0.211 of palladium acetate was dissolved in 15 g of water. To this mixture was added 10 grams of KEVLAR brand p-aramid polymer. The water in this mixture was evaporated at low heat while the mixture was agitated. The concentration of Pd on the p-aramid powder was about 1%.

When the mix of the polymer and the catalyst agent precursor was dry, the catalyst was activated by adding a few drops of hydrazine monohydrate. The resulting mixture was then cooled and, the excess liquid was removed by evaporation.

1 g of the resulting catalyst composition was mixed with 45 ml of cyclohexane and 5 ml of acetone. The reactor was purged with nitrogen, and then it was pressurized with hydrogen to a pressure of 125–150 psi. The hydrogenation was run at a temperature range of from 100–150° C. as a batch reaction. After approximately 2 hours at 100° C. the amount of isopropanol in the reaction liquid was 22% by volume. The temperature was increased to 130° and held for about 2 hours, and then increased to 150° for the last hour. The concentration of the isopropanol in the reaction mixture was 49% after 5 hours.

B. A catalyst composition of approximately 1% by weight Pd on a p-aramid floc was prepared as described in paragraph A, above. Analysis of the hydrogenation reaction mixture showed 0.32% isopropanol at 65° C. and 11% when the reaction temperature was increased to 100° C.

C. Aramid paper made from nickel plated p-aramid fibers was used as catalyst in the hydrogenation reaction. The papers were prepared from fibers that were first treated with acid according to U.S. Pat. No. 5,302,415 to promote adhesion of the nickel to the fiber surface. Nickel was then deposited on the fibers by an electroless plating process where dimethylamine borane was used to reduce the nickel.

A reaction mixture was formed using a 1 g sample of the electroless nickel plated paper and 5 g of acetone in 45 ml cyclohexane. The mixture was made in the reaction chamber of a Parr autoclave. The hydrogenation was run at 130° C.

The paper in this mixture was activated by the hydrogen in the Parr autoclave, and the hydrogenation reaction was initiated. The volume percent of isopropanol in the reaction mixture was approximately 20% after 2 hours.

A second sample of the nickel plated paper was treated with a solution of palladium acetate as described in paragraph A. The palladium accomplished the activation of the nickel in the autoclave under the same conditions as described with the nickel plated paper. After one hour reaction at 130° C., the concentration of isopropanol in the solution was 19.3%.

D. A solution of about 15% by weight cobalt acetate was prepared in water. To this mixture was added about 10 g of p-aramid polymer powder. The mixture was processed as described in A, above. After drying and washing, an analytical determination showed the concentration of cobalt on the polymer powder was 1.22% by weight. In the hydrogenation reaction this catalyst composition yielded a reaction mixture containing 0.25 isopropanol at 65° C. and 1.55% at 100–130° C.

A second sample of this catalyst composition was treated with a solution of ruthenium acetate so that the resulting ruthenium concentration on the catalyst powder was about 1% by weight. The hydrogenation was run using this second catalyst (Ru/Co). It produced a concentration of 1.19% isopropanol at 65° C. and of 2.17% at 100° C.

E. A catalyst composition was prepared using p-aramid powder and palladium chloride as described in A, above. The analysis of the resulting catalyst composition showed that the Pd concentration was approximately 0.05% by weight. In the hydrogenation run at 100–150° C. After 2 hours, this catalyst composition produced a reaction solution having 22% isopropanol. After the reaction, the catalyst composition was recovered and analyzed for the weight percent of Pd present. It was found to be approximately 0.05% within the accuracy of the method of the determination.

Example 4

This example illustrates an acid catalyst of the present invention.

A p-aramid felt was impregnated with NAFION brand perfluorosulfonic acid with TEF copolymer as follows: 30% by weight water solution of NAFION having 0.5 to 0.8% by weight of dimethyl sulfoxide was prepared. The felt was impregnated with this solution and then dried for 3 hours at 120° C. The dried felt was then washed in water and dried in a vacuum oven. An infrared scan of the catalyst sample was made. The scan showed that NAFION was present in the felt.

The catalyst sample was evaluated in an alkylation reaction as follows. To a reaction solution containing 70% by weight toluene and 30% by weight cyclohexene was added 0.5 grams of the p-aramid NAFION supported catalyst. This mixture was refluxed at about 100° C. After 1 hour the reaction mixture was sampled. GC analysis showed the presence of both cyclohexyl cyclohexane and cyclohexyl toluene. After 4 hours reaction, the volume percent of these products present was present at 5 and 15%, respectively in the reaction mixture.

What is claimed is:

1. A catalyst composition consisting essentially of a catalyst support with a catalyst agent adhered thereto, wherein the catalyst support is p-aramid polymer in the shape of a fabric, honeycomb, or tube and the catalyst agent is adhered on or within the support.

2. The catalyst composition of claim 1 wherein the p-aramid is poly(p-phenylene terephthalamide).

3. The catalyst composition of claim 1 wherein the catalyst support is p-aramid fibers.

4. The catalyst composition of claim 1 wherein the catalyst agent is 0.05% to 20%, by weight, of the total weight of the catalyst agent and the catalyst support.

5. The catalyst composition of claim 4 wherein the catalyst agent is 0.5% to 5%, by weight, of the total weight of the catalyst agent and the catalyst support.

6. The catalyst composition of claim 1 wherein the catalyst agent is a metal selected from metals of Periodic Chart Groups Ib, IIb, VIa, VIIa, and VIII.

7. The catalyst composition of claim 1 wherein the catalyst agent is a metal selected from the group consisting of platinum, palladium, nickel, cobalt, manganese, ruthenium, rhodium, iridium, copper, iron, zinc, and combinations of those metals.

* * * * *